United States Patent
Liang et al.

(10) Patent No.: US 10,644,791 B2
(45) Date of Patent: May 5, 2020

(54) IMPAIRMENT MONITORING APPARATUS, IMPAIRMENT MONITORING AND COMPENSATING SYSTEM AND METHOD

(71) Applicant: FUJITSU LIMITED, Kawasaki-shi, Kanagawa (JP)

(72) Inventors: Junpeng Liang, Beijing (CN); Yangyang Fan, Beijing (CN); Zhenning Tao, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/288,181

(22) Filed: Feb. 28, 2019

(65) Prior Publication Data

US 2019/0312637 A1 Oct. 10, 2019

(30) Foreign Application Priority Data

Apr. 9, 2018 (CN) .......................... 2018 1 0311647

(51) Int. Cl.
*H04B 10/079* (2013.01)
*H04B 10/61* (2013.01)
*H04B 17/21* (2015.01)
*H04L 25/03* (2006.01)
*H04B 3/32* (2006.01)
*H04B 17/14* (2015.01)
*H04B 10/556* (2013.01)

(52) U.S. Cl.
CPC .......... *H04B 10/0795* (2013.01); *H04B 3/32* (2013.01); *H04B 17/14* (2015.01); *H04B 17/21* (2015.01); *H04L 25/03968* (2013.01); *H04B 10/5561* (2013.01); *H04L 2025/03426* (2013.01)

(58) Field of Classification Search
CPC ...... H04B 10/0795–07957; H04B 10/61–6166
See application file for complete search history.

(56) References Cited

U.S. PATENT DOCUMENTS 8,977,141 B2* 3/2015 Horikoshi .......... H03H 21/0012
398/202
9,369,213 B1* 6/2016 Kakande ............ H04B 10/6166
(Continued)

FOREIGN PATENT DOCUMENTS

CN 103378908 A 10/2013
CN 105635009 A 6/2016
(Continued)

*Primary Examiner* — Nathan M Cors
(74) *Attorney, Agent, or Firm* — Staas & Halsey LLP (57) ABSTRACT

Embodiments of this disclosure provide an impairment monitoring apparatus, impairment monitoring and compensating system and method. As a parameter of a impairment of a receiver end and/or a parameter of an impairment of a transmitter end is/are determined according to a preset period or a preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

8 Claims, 4 Drawing Sheets

(56) References Cited

U.S. PATENT DOCUMENTS

| | | | |
|---|---|---|---|
| 2010/0329397 A1 | 12/2010 | Kim | |
| 2012/0177368 A1* | 7/2012 | Aoki | H04B 10/616 |
| | | | 398/38 |
| 2013/0084080 A1* | 4/2013 | Shibutani | H04B 10/6161 |
| | | | 398/208 |
| 2013/0236169 A1* | 9/2013 | Gaudette | H04B 10/0793 |
| | | | 398/25 |
| 2013/0272719 A1 | 10/2013 | Yan et al. | |
| 2014/0023359 A1* | 1/2014 | Tsubouchi | H04B 10/0799 |
| | | | 398/24 |
| 2015/0372765 A1* | 12/2015 | Yasuda | H04B 10/613 |
| | | | 398/29 |
| 2017/0019319 A1 | 1/2017 | Li et al. | |
| 2019/0181950 A1* | 6/2019 | Ishimura | H04B 10/079 |
| 2019/0253176 A1* | 8/2019 | Liu | H04B 10/532 |

FOREIGN PATENT DOCUMENTS

| | | |
|---|---|---|
| CN | 106712842 A | 5/2017 |
| CN | 106878229 A | 6/2017 |

\* cited by examiner

IMPAIRMENT MONITORING APPARATUS, IMPAIRMENT MONITORING AND COMPENSATING SYSTEM AND METHOD

CROSS-REFERENCE TO RELATED APPLICATIONS

This application claims the benefit of Chinese Patent Application No. 201810311647.4, filed on Apr. 9, 2018, in the State Intellectual Property Office of China, the disclosure of which is incorporated herein by reference.

TECHNICAL FIELD

This disclosure relates to the field of communication technologies, and in particular to a impairment monitoring apparatus, an impairment monitoring and compensating system and method.

BACKGROUND

Currently, a high-order modulation format using a higher baud rate is a preferred solution to further increase an interface rate of a single fiber. However, the high-order modulation format using the high baud rate is very sensitive to IQ (in-phase and quadrature) imbalances and inter-path crosstalk of an optical transmitter and receiver. The IQ imbalances mainly include the following effects: an amplitude imbalance between an I-path and a Q-path, a phase imbalance between the I-path and the Q-path, an amplitude-frequency response and phase-frequency response imbalance between the I-path and the Q-path, and a delay skew between the I-path and the Q-path. In addition, since the optical transmitter and receiver have a plurality of paths of input and output, crosstalk between the plurality of paths due to circuit wiring and the like also causes a certain performance penalty. It can be seen that in an optical communications system, impairments of the transmitter end and receiver end mainly include: an IQ amplitude imbalance, an IQ phase imbalance, an IQ amplitude-frequency response and phase-frequency response imbalance and IQ delay skew and crosstalk between a plurality of paths.

In order to detect and compensate for these impairments, a number of different methods have been proposed. Common to these methods are that filter coefficients used for compensating for the impairments are iterated and updated by a filter in a real-time manner, and the impairments are compensated for in a real-time manner.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that due to that filter coefficients used for compensating for the impairments are iterated and updated by a filter in a real-time manner in existing methods, complexity in calculation is relatively high and power consumption of the system is large.

It was further found by the inventors that parameters of the impairments in the optical communications system are not changed rapidly, or, in other words, the parameters of the impairments are changed slowly.

Embodiments of this disclosure provide an impairment monitoring apparatus, impairment monitoring and compensating system and method. A parameter of a impairment of a receiver end and/or a parameter of an impairment of a transmitter end is/are determined according to a preset period or a preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

According to a first aspect of the embodiments of this disclosure, there is provided an impairment monitoring apparatus, provided in a receiver end, the apparatus comprising: a first monitoring unit configured to determine a parameter of an impairment of the receiver end according to a preset period or a preset condition, and transmit the parameter of the impairment of the receiver end to a first compensator to compensate for the impairment of the receiver end in a received signal, and/or transmit the parameter of the impairment of the receiver end to a management device, so that the management device analyzes a cause of the impairment and/or calibrates the receiver according to the parameter of the impairment of the receiver end; and/or a second monitoring unit configured to determine a parameter of an impairment of a transmitter end according to a preset period or a preset condition, and transmit the parameter of the impairment of the transmitter end to a second compensator to compensate for the impairment of the transmitter end in the received signal, and/or transmit the parameter of the impairment of the transmitter end to the management device, so that the management device analyzes a cause of the impairment and/or calibrates the transmitter according to the parameter of the impairment of the transmitter end.

According to a second aspect of the embodiments of this disclosure, there is provided an impairment monitoring and compensating system, comprising: the impairment monitoring apparatus as described in the first aspect; and a first compensator configured to compensate for an impairment of a receiver end in a received signal, and/or a second compensator configured to compensate for an impairment of a transmitter end in a received signal; and/or a management device configured to analyze a cause of an impairment and/or calibrate the receiver and/or the transmitter according to a parameter of an impairment of the receiver end and/or a parameter of an impairment of the transmitter end.

According to a third aspect of the embodiments of this disclosure, there is provided a receiver, comprising the impairment monitoring apparatus as described in the first aspect or the impairment monitoring and compensating system as described in the second aspect.

According to a fourth aspect of the embodiments of this disclosure, there is provided an impairment monitoring method, applicable to a receiver end, the method comprising: determining a parameter of an impairment of the receiver end by a first monitoring unit according to a preset period or a preset condition, and transmitting the parameter of the impairment of the receiver end to a first compensator to compensate for the impairment of the receiver end in a received signal, and/or transmitting the parameter of the impairment of the receiver end to a management device, so that the management device analyzes a cause of the impairment and/or calibrates the receiver according to the parameter of the impairment of the receiver end; and/or determining a parameter of a impairment of the transmitter end by a second monitoring unit according to a preset period or a preset condition, and transmitting the parameter of the impairment of the transmitter end to a second compensator to compensate for the impairment of the transmitter end in the received signal, and/or transmitting the parameter of the impairment of the transmitter end to the management device, so that the management device analyzes a cause of the impairment and/or calibrates the transmitter according to the parameter of the impairment of the transmitter end.

According to a fifth aspect of the embodiments of this disclosure, there is provided an impairment monitoring and compensating method, comprising: the impairment monitoring method as described in the fourth aspect; and compensating for an impairment of a receiver end in a received signal, and/or compensating for an impairment of a transmitter end in a received signal; and/or analyzing a cause of an impairment and/or calibrating the receiver and/or the transmitter according to a parameter of an impairment of the receiver end and/or a parameter of an impairment of the transmitter end.

An advantage of the embodiments of this disclosure exists in that as a parameter of an impairment of a receiver end and/or a parameter of an impairment of a transmitter end is/are determined according to a preset period or a preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
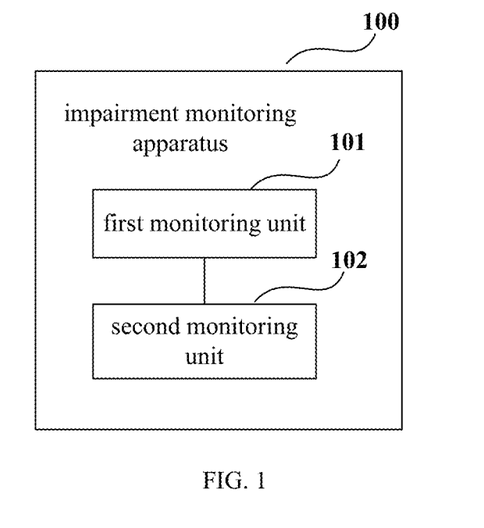
FIG. 1 is a schematic diagram of the impairment monitoring apparatus of Embodiment 1 of this disclosure.

The embodiment of this disclosure provides an impairment monitoring apparatus, provided in a receiver end of an optical communications system. FIG. 1 is a schematic diagram of the impairment monitoring apparatus of Embodiment 1 of this disclosure. As shown in FIG. 1, an apparatus 100 includes:

a first monitoring unit 101 configured to determine a parameter of an impairment of the receiver end according to a preset period or a preset condition, and transmit the parameter of the impairment of the receiver end to a first compensator to compensate for the impairment of the receiver end in a received signal, and/or transmit the parameter of the impairment of the receiver end to a management device, so that the management device analyzes a cause of the impairment and/or calibrates the receiver according to the parameter of the impairment of the receiver end;

and/or a second monitoring unit 102 configured to determine a parameter of an impairment of a transmitter end according to a preset period or a preset condition, and transmit the parameter of the impairment of the transmitter end to a second compensator to compensate for the impairment of the transmitter end in the received signal, and/or transmit the parameter of the impairment of the transmitter end to the management device, so that the management device analyzes a cause of the impairment and/or calibrates the transmitter according to the parameter of the impairment of the transmitter end.

It can be seen from this embodiment that as the parameter of the impairment of the receiver end and/or the parameter of the impairment of the transmitter end is/are determined according to the preset period or the preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

In this embodiment, for example, the parameter of an impairment of the receiver end includes at least one of the following: IQ amplitude imbalance of the receiver end, IQ phase imbalance of the receiver end, IQ amplitude response and phase-frequency response imbalance of the receiver end, IQ delay skew of the receiver end, and crosstalk between paths of the receiver end.

For example, the parameter of an impairment of the transmitter end includes at least one of the following: IQ amplitude imbalance of the transmitter end, IQ phase imbalance of the transmitter end, IQ amplitude response and phase-frequency response imbalance of the transmitter end, IQ delay skew of the transmitter end, and crosstalk between paths of the transmitter end.

In this embodiment, when the optical communications system is a single-polarization system, both the transmitter end and the receiver end may have signals of two paths, that is, an I-path signal and a Q-path signal; and when the optical communications system is a dual-polarization system, both the transmitter end and the receiver end may have signals of four paths, that is, an Ix-path signal, a Qx-path signal, an Iy-path signal, and a Qy-path signal.

In this embodiment, the first monitoring unit 101 and the second monitoring unit 102 determine the parameter of the impairment according to the preset period or the preset condition, the preset period and the preset condition being set according to an actual situation.

For example, the preset period may be a frame or a packet, that is, for example, the parameter of the impairment is re-determined for a new frame or a new packet.

For example, the preset condition may be startup of the apparatus 100, or that a channel environment of the optical communications system is changed, such as occurrence of routing handover. That is, for example, when the channel environment of the optical communications system is changed, the parameter of the impairment is re-determined.

In this embodiment, the first monitoring unit 101 may determine the parameter of the impairment by using various methods. A method for determining the parameter of the impairment of the receiver end of this embodiment shall be illustrated below.

Figure 2:
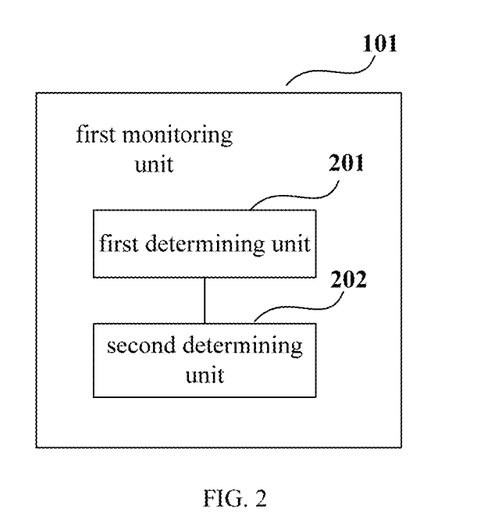
FIG. 2 is a schematic diagram of the first monitoring unit 101 of Embodiment 1 of this disclosure.

FIG. 2 is a schematic diagram of the first monitoring unit 101 of Embodiment 1 of this disclosure. As shown in FIG. 2, the first monitoring unit 101 includes:

a first determining unit 201 configured to determine a first filter coefficient of the first monitoring unit according to a pilot signal inserted into a transmission signal; and a second determining unit 202 configured to take the first filter coefficient and/or a parameter obtained through calculation according to the first filter coefficient as the parameter of the impairment of the receiver end.

Hence, by determining the first filter coefficient according to the pilot signal, a radial decision error may be avoided.

In this embodiment, the pilot signal inserted into the transmission signal may be a constant modulus signal, such as a quadrature phase shift keying (QPSK) signal in a transmission signal in a high-order modulation format. Hence, setting the pilot signal to be a constant modulus signal may further simplify the calculation.

In this embodiment, the first determining unit 201 may determine the first filter coefficient of the first monitoring unit 101 based on a blind equalization algorithm and according to the pilot signal, and reference may be made to the related art for a specific calculation method.

In this embodiment, the first monitoring unit 101 may be a multiple input multiple output (MIMO) monitor based on a blind equalization algorithm, such as a 4×4 real-number filter, or a 4×2 complex filter. And in this embodiment, description shall be given by taking a 4×4 real-number filter as an example.

Figure 3:
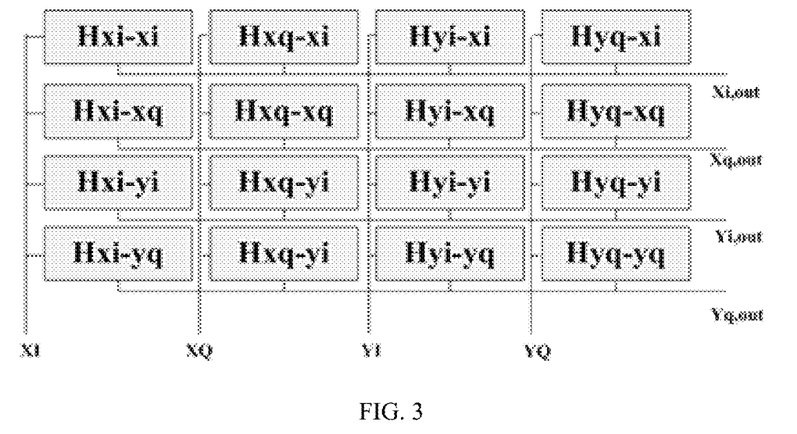
FIG. 3 is a schematic diagram of a structure of the first monitoring unit 101 of Embodiment 1 of this disclosure.

FIG. 3 is a schematic diagram of a structure of the first monitoring unit 101 of Embodiment 1 of this disclosure. As shown in FIG. 3, input of the first monitoring unit 101 is XI, XQ, YI and YQ, and output thereof is Xi,out, Xq,out, Yi,out and Yq,out. In this embodiment, $H_{ms-nt}(m,n \in \{x,y\}, s,t \in \{i,q\})$ is the first filter coefficient obtained after trained according to the pilot signal.

In this embodiment, the coefficients on a leading diagonal in the first filter coefficient may denote differences of amplitude-frequency responses and phase-frequency responses between signals of paths of the receiver end, and coefficients on an off-diagonal may denote distribution and magnitudes of frequencies of crosstalk between the signals of paths of the receiver end.

For example, as shown in FIG. 3, coefficients $H_{xi-xi}$, $H_{xq-xq}$, $H_{yi-yi}$ and $H_{yq-yq}$ on the leading diagonal in the first filter coefficient may denote the differences of amplitude-frequency responses and phase-frequency responses between signals of paths of the receiver end, and coefficients other than these coefficients may denote the distribution and magnitudes of frequencies of crosstalk between the signals of paths of the receiver end.

For example, $H_{xq-xi}$ denotes crosstalk between IQ in an X-path signal, a magnitude of the crosstalk being expressed quantitatively by formula (1) below:

$$Crosstalk_{Xiq} = \frac{\text{sum}(H^2_{xq-xi})}{\text{sum}(H^2_{xi-xi})}; \quad (1)$$

where, $Crosstalk_{Xjq}$ denotes the crosstalk between IQ in the X-path signal.

In this embodiment, after the first monitoring unit 101 determines the parameter of the impairment of the receiver end according to the preset period or the preset condition, it transmits the parameter of the impairment of the receiver end to the first compensator to compensate for the impairment of the receiver end in a received signal, and/or transmits the parameter of the impairment of the receiver end to the management device, so that the management device analyzes the cause of the impairment and/or calibrates the receiver according to the parameter of the impairment of the receiver end.

In this embodiment, the first compensator may be a compensator of various types. For example, the first compensator is a quasi-static compensator.

For example, the first compensator is a 4×4 finite impulse response (FIR) filter, or an FIR filter of 4 single paths.

When the first compensator is the 4×4 FIR filter, a converged coefficient $H_{ms-nt}$ may be directly assigned to the 4×4 FIR filter, for use in compensation for the IQ imbalance and crosstalk between the paths.

When the first compensator is the FIR filter of 4 single paths, the filter coefficients on the leading diagonal may be fed back to the FIR filter of 4 single paths. And furthermore, other coefficients may be calculated according to the filter coefficients, such as a value of the IQ delay skew, and the value of the skew may be taken as the parameter of the impairment of the receiver end to provide to the first compensator.

Taking the value of the IQ delay skew of the X-path signal as an example, the value of the skew may be calculated by using formulae (2) and (3) below:

$$\text{skew} = \frac{1}{2\pi}\frac{d\varphi}{df}, \tag{2}$$

$$\varphi(f) = \text{unwrap}[\text{angle}(DFT(H_{xq-xq}) * DFT(H^*_{xi-xi}))]; \tag{3}$$

where, skew denotes values of the I-path and Q-path of the X-path signal, unwrap [ ] denotes an unwrap function, and DFT( ) denotes discrete Fourier transform.

Hence, the value of the skew is directly calculated according to the filter coefficient for use in compensation, so that defects of being relatively complex and being relatively long in time consumption in an existing scanning method may be overcome, and the number of equalization taps in an equalization process at the receiver end may be lowered.

In this embodiment, the second monitoring unit 102 may determine the parameter of the impairment of the transmitter end by using various methods. A method for determining the parameter of the impairment of the transmitter end of this embodiment shall be illustrated below.

Figure 4:
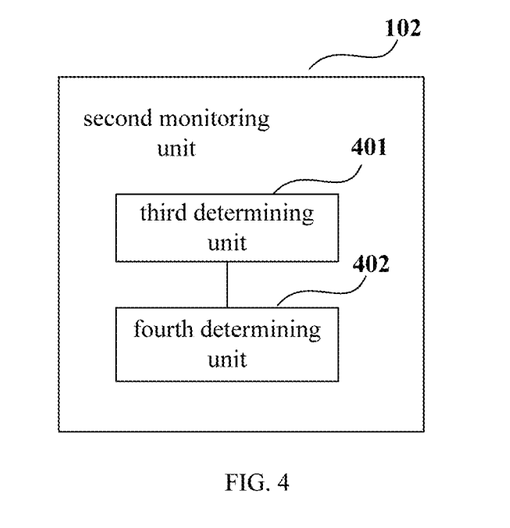
FIG. 4 is a schematic diagram of the second monitoring unit 102 of Embodiment 1 of this disclosure.

FIG. 4 is a schematic diagram of the second monitoring unit 102 of Embodiment 1 of this disclosure. As shown in FIG. 4, the second monitoring unit 102 includes:

a third determining unit 401 configured to determine a second filter coefficient of the second monitoring unit according to a pilot signal inserted into a transmission signal; and a fourth determining unit 402 configured to take the second filter coefficient and/or a parameter obtained through calculation according to the second filter coefficient as the parameter of the impairment of the transmitter end.

In this embodiment, in determining the second filter coefficient by the third determining unit 401 according to the pilot signal in the transmission signal, a signal obtained by performing receiver end impairment compensation on a received signal is based.

Hence, by determining the second filter coefficient according to the pilot signal, a path ambiguity problem in the X-path, Y-path, I-path and Q-path may be avoided.

In this embodiment, the third determining unit 401 may determine the second filter coefficient of the second monitoring unit 102 based on a minimum mean square error (MMSE) algorithm or a least-mean-square (LMS) algorithm and according to the pilot signal, and reference may be made to the related art for a specific calculation method.

In this embodiment, the second monitoring unit 102 may be an MIMO monitor based on an MMSE algorithm or an LMS algorithm, such as a 4×4 real-number filter, or a 4×2 complex filter. In this embodiment, description shall be given by taking a 4×4 real-number filter as an example, with a manner of arrangement of its coefficients being similar to that of the first monitoring unit 101 shown in FIG. 3, and its second filter coefficient being expressed by $M_{ms-nt}(m,n \in \{x, y\}, s,t \in \{i,q\})$.

In this embodiment, other coefficients may be calculated according to the second filter coefficient $M_{ms-nt}$ $(m,n \in \{x, y\}, s,t \in \{i,q\})$.

Taking an imbalance effect between the I-path and the Q-path of the X-path signal as an example, its IQ amplitude imbalance, IQ phase imbalance and IQ delay skew may be calculated according to formulae (4)-(7) below:

$$\gamma_{dB} = 20\log_{10}\left(\frac{\sum M_{xi-xi}}{\sum M_{xq-xq}}\right), \tag{4}$$

$$\hat{\phi}_{deg} = 2\sin^{-1}\left(\frac{\sum M_{xi-xq}}{\sum M_{xq-xq}}\right)\frac{180}{\pi}, \tag{5}$$

$$GD_{ii}(\omega) = \frac{d(DFT\{M_{xi-xi}\})}{d\omega}(DFT\{M_{xi-xi}\})^{-1}, \tag{6}$$

$$\text{skew}(\omega) = GD_{ii}(\omega) - GD_{qq}(\omega); \tag{7}$$

where, $\gamma_{dB}$ denotes the IQ amplitude imbalance, $\hat{\phi}_{deg}$ denotes the IQ phase imbalance, skew(ω) denotes the IQ delay skew, and DFT( ) denotes discrete Fourier transform.

In this embodiment, after the second monitoring unit 102 determines the parameter of the impairment of the transmitter end according to the preset period or the preset condition, it transmits the parameter of the impairment of the transmitter end to the second compensator to compensate for the impairment of the transmitter end in a received signal, and/or transmits the parameter of the impairment of the transmitter end to the management device, so that the management device analyzes the cause of the impairment and/or calibrates the transmitter according to the parameter of the impairment of the transmitter end.

In this embodiment, the second compensator may be a compensator of various types. For example, the second compensator is a quasi-static compensator.

In this embodiment, the first monitoring unit 101 and the second monitoring unit 102 may coexist, or one of them may be set as demanded.

Furthermore, the first monitoring unit 101 may transmit the parameter of the impairment of the receiver end to the first compensator to compensate for the impairment of the receiver end in the received signal, or may transmit the parameter of the impairment of the receiver end to the management device, so that the management device analyzes the cause of the impairment and/or calibrates the receiver according to the parameter of the impairment of the receiver end, or may perform both the above two operations.

And furthermore, the second monitoring unit 102 may transmit the parameter of the impairment of the transmitter end to the second compensator to compensate for the impairment of the transmitter end in the received signal, or transmit the parameter of the impairment of the transmitter end to the management device, so that the management device analyzes the cause of the impairment and/or calibrates the transmitter according to the parameter of the impairment of the transmitter end, or perform both the above two operations.

It can be seen from the above embodiment that as the parameter of the impairment of the receiver end and/or the parameter of the impairment of the transmitter end is/are determined according to the preset period or the preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

Embodiment 2

Figure 5:
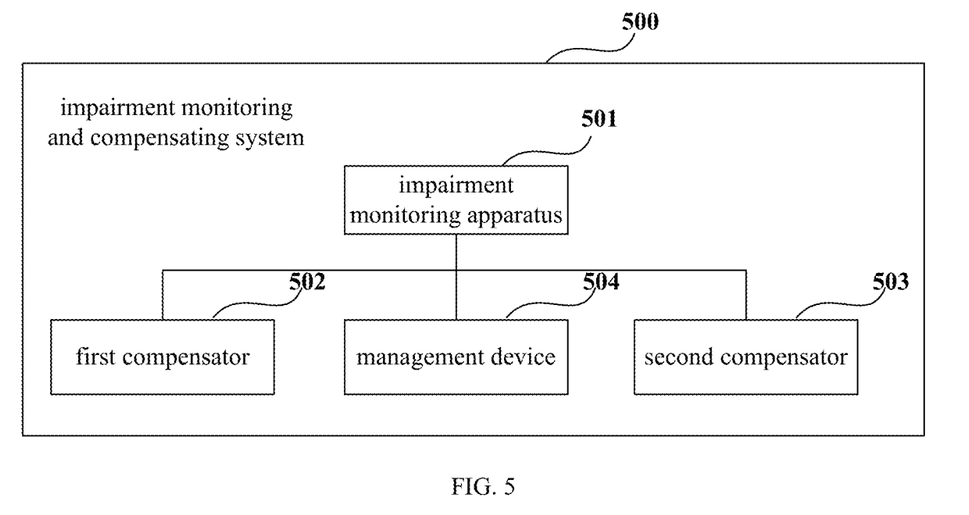
FIG. 5 is a schematic diagram of the impairment monitoring and compensating system of Embodiment 2 of this disclosure.

The embodiment of this disclosure provides an impairment monitoring and compensating system. FIG. 5 is a schematic diagram of the impairment monitoring and compensating system of Embodiment 2 of this disclosure. As shown in FIG. 5, a system 500 includes:

an impairment monitoring apparatus 501; and
at least one of the following:
a first compensator 502 configured to compensate for an impairment of a receiver end in a received signal;
a second compensator 503 configured to compensate for an impairment of a transmitter end in a received signal; and
a management device 504 configured to analyze a cause of an impairment and/or calibrate the receiver and/or the transmitter according to a parameter of an impairment of the receiver end and/or a parameter of an impairment of the transmitter end.

In this embodiment, a structure and functions of the impairment monitoring apparatus 501 are identical to those contained in Embodiment 1, which shall not be described herein any further.

In this embodiment, the first compensator 502 and the second compensator 503 may be compensators of various types, such as quasi-static compensators. And what is contained in Embodiment 1 may be referred to for details, which shall not be described herein any further.

In this embodiment, the first compensator 502 and/or the second compensator 503 may perform compensation on the impairment of the receiver end and/or the impairment of the transmitter end according to the parameter of the impairment of the receiver end and/or the parameter of the impairment of the transmitter end determined by the impairment monitoring apparatus 501. And furthermore, the first compensator 502 and/or the second compensator 503 may also perform compensation on the impairment of the receiver end and/or the impairment of the transmitter end by using other methods.

In this embodiment, the management device 504 may analyze the cause of the impairment, or calibrate the receiver and/or the transmitter, according to the parameter of the impairment of the receiver end and/or the parameter of the impairment of the transmitter end, or perform both the above two operations.

Hence, through failure analysis, a respond may be performed rapidly and efficiently, or the receiver and/or the transmitter may be calibrated directly, thereby further ensuring the performance of the system.

In this embodiment, reference may be made to the related art for specific methods for analyzing the cause of the impairment and/or calibrating the receiver and/or the transmitter by the management device 504, which shall not be described herein any further.

It can be seen from the above embodiment that as the parameter of the impairment of the receiver end and/or the parameter of the impairment of the transmitter end is/are determined according to the preset period or the preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

Embodiment 3

The embodiment of this disclosure provides a receiver, including the impairment monitoring apparatus described in Embodiment 1 or the impairment monitoring and compensating system described in Embodiment 2. Reference may be made to what are contained in embodiments 1 and 2 for specific structures and functions of the impairment monitoring apparatus and the impairment monitoring and compensating system, which shall not be described herein any further.

Figure 6:
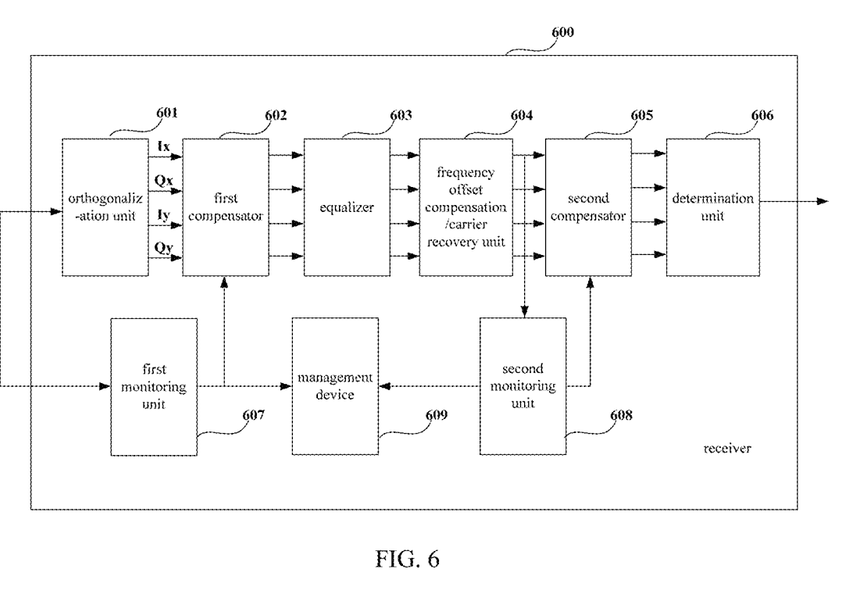
FIG. 6 is a schematic diagram of a systematic structure of the receiver of Embodiment 3 of this disclosure.

FIG. 6 is a schematic diagram of a systematic structure of the receiver of Embodiment 3 of this disclosure. As shown in FIG. 6, a receiver 600 includes an orthogonalization unit 601, a first compensator 602, an equalizer 603, a frequency offset compensation/carrier recovery unit 604, a second compensator 605, a determination unit 606, a first monitoring unit 607, a second monitoring unit 608 and a management device 609.

In this embodiment, reference may be made to the related art for specific structures and functions of the orthogonalization unit 601, the equalizer 603, the frequency offset compensation/carrier recovery unit 604 and the determination unit 606.

In this embodiment, reference may be made to what are contained in embodiments 1 and 2 for specific structures and functions of the first compensator 602, the second compensator 605, the first monitoring unit 607, the second monitoring unit 608 and the management device 609.

As shown in FIG. 6, a received signal is inputted into the orthogonalization unit 601 and the first monitoring unit 607, the orthogonalization unit 601 decomposes the received signal into an Ix-path signal, a Qx-path signal, an Iy-path signal, and a Qy-path signal, the first monitoring unit 607 determines a parameter of an impairment of a receiver end according to a preset period or a preset condition, and transmits the parameter of the impairment of the receiver end to the first compensator 602 and the management device 609, the first compensator 602 performs compensation on the impairment of the receiver end according to the parameter of the impairment of the receiver end, and the received signal after the compensation on the impairment of the receiver end is performed enters into the equalizer 603 for being equalization processed. In this case, the equalizer 603 may be an equalizer of short taps. The received signal passing through the equalizer 603 is inputted into the frequency offset compensation/carrier recovery unit 604 for frequency offset compensation and carrier recovery, the second monitoring unit 608 determines the parameter of the impairment of the transmitter end according to a preset period or a preset condition and the received signal after the frequency offset compensation and carrier recovery, and transmits the parameter of the impairment of the transmitter end to the second compensator 605 and the management device 609, the second compensator 605 performs compensation on the impairment of the transmitter end according to the parameter of the impairment of the transmitter end, the received signal after compensation on the impairment of the transmitter end is performed is inputted into the determination unit 606 for determination and then is outputted, and the management device 609 analyzes a cause of the impairments and/or calibrates the receiver and the transmitter according to the parameter of the impairment of the receiver end and the parameter of the impairment of the transmitter end.

In this embodiment, the functions of the first compensator 602, the second compensator 605, the first monitoring unit 607, the second monitoring unit 608 and the management device 609 may be executed by a processor of the receiver, such as a digital signal processor (DSP) of the receiver.

It can be seen from the above embodiment that as the parameter of the impairment of the receiver end and/or the parameter of the impairment of the transmitter end is/are determined according to the preset period or the preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

Embodiment 4

Figure 7:
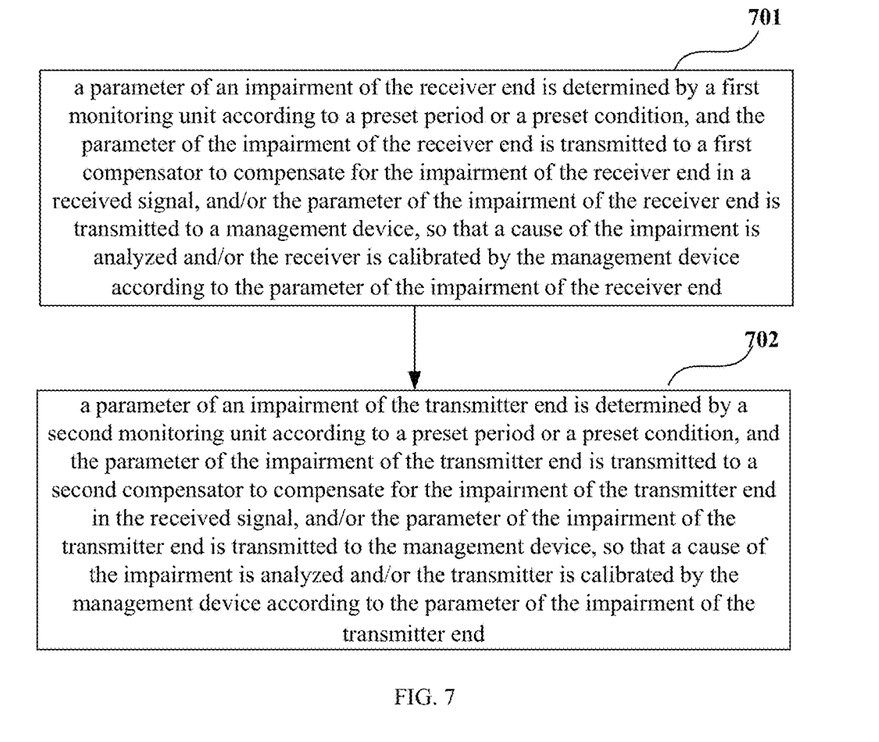
FIG. 7 is a schematic diagram of the impairment monitoring method of Embodiment 4 of this disclosure.

The embodiment of this disclosure provides an impairment monitoring method, which corresponds to the impairment monitoring apparatus of Embodiment 1. FIG. 7 is a schematic diagram of the impairment monitoring method of Embodiment 4 of this disclosure. As shown in FIG. 7, the method includes:

Step 701: a parameter of an impairment of the receiver end is determined by a first monitoring unit according to a preset period or a preset condition, and the parameter of the impairment of the receiver end is transmitted to a first compensator to compensate for the impairment of the receiver end in a received signal, and/or the parameter of the impairment of the receiver end is transmitted to a management device, so that a cause of the impairment is analyzed and/or the receiver is calibrated by the management device according to the parameter of the impairment of the receiver end; and/or Step 702: a parameter of an impairment of the transmitter end is determined by a second monitoring unit according to a preset period or a preset condition, and the parameter of the impairment of the transmitter end is transmitted to a second compensator to compensate for the impairment of the transmitter end in the received signal, and/or the parameter of the impairment of the transmitter end is transmitted to the management device, so that a cause of the impairment is analyzed and/or the transmitter is calibrated by the management device according to the parameter of the impairment of the transmitter end.

In this embodiment, the method may include step 701 or step 702, or may include both step 701 and step 702, and what is contained in Embodiment 1 may be referred to for specific implementations, which shall not be described herein any further.

It can be seen from the above embodiment that as the parameter of the impairment of the receiver end and/or the parameter of the impairment of the transmitter end is/are determined according to the preset period or the preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

Embodiment 5

Figure 8:
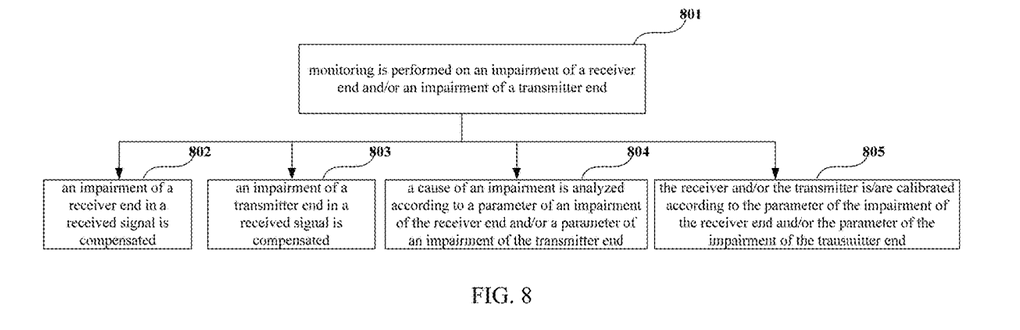
FIG. 8 is a schematic diagram of the impairment monitoring and compensating method of Embodiment 5 of this disclosure.

The embodiment of this disclosure provides an impairment monitoring and compensating method, which corresponds to the impairment monitoring and compensating system of Embodiment 2. FIG. 8 is a schematic diagram of the impairment monitoring and compensating method of Embodiment 5 of this disclosure. As shown in FIG. 8, the method includes:

Step 801: monitoring is performed on an impairment of a receiver end and/or an impairment of a transmitter end; and at least one of the following steps:

Step 802: an impairment of a receiver end in a received signal is compensated;

Step 803: an impairment of a transmitter end in a received signal is compensated;

Step 804: a cause of an impairment is analyzed according to a parameter of an impairment of the receiver end and/or a parameter of an impairment of the transmitter end;

Step 805: the receiver and/or the transmitter is/are calibrated according to the parameter of the impairment of the receiver end and/or the parameter of the impairment of the transmitter end.

In this embodiment, reference may be made to what are contained in embodiments 1 and 2 for specific implementations of the above steps, which shall not be described herein any further.

It can be seen from the above embodiment that as the parameter of the impairment of the receiver end and/or the parameter of the impairment of the transmitter end is/are determined according to the preset period or the preset condition to perform compensation or calibration, complexity of calculation and power consumption of the system may be efficiently lowered. And as the parameter of the impairment of the receiver end and the parameter of the impairment of the transmitter end are not changed rapidly, determining these parameters according to the preset period or the preset condition to perform compensation or calibration will not affect an effect of the compensation or calibration, thereby ensuring a performance of the system.

An embodiment of the present disclosure provides a computer readable program code, which, when executed in an impairment monitoring apparatus or a receiver, will cause a computer to carry out the impairment monitoring method as described in Embodiment 4 in the impairment monitoring apparatus or the receiver.

An embodiment of the present disclosure provides a computer readable program code, which, when executed in an impairment monitoring and compensating system or a receiver, will cause a computer to carry out the impairment monitoring and compensating method as described in Embodiment 5 in the impairment monitoring and compensating system or the receiver.

An embodiment of the present disclosure provides a computer storage medium, including a computer readable program code, which will cause a computer to carry out the impairment monitoring method as described in Embodiment 4 in an impairment monitoring apparatus or a receiver.

An embodiment of the present disclosure provides a computer storage medium, including a computer readable program code, which will cause a computer to carry out the impairment monitoring and compensating method as described in Embodiment 5 in an impairment monitoring and compensating system or a receiver.

The impairment monitoring method carried out in the impairment monitoring apparatus or the receiver described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 7. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. An impairment monitoring apparatus, provided in a receiver end, the apparatus including:

a first monitoring unit configured to determine a parameter of an impairment of the receiver end according to a preset period or a preset condition, and transmit the parameter of the impairment of the receiver end to a first compensator to compensate for the impairment of the receiver end in a received signal, and/or transmit the parameter of the impairment of the receiver end to a management device, so that the management device analyzes a cause of the impairment and/or calibrates the receiver according to the parameter of the impairment of the receiver end; and/or a second monitoring unit configured to determine a parameter of an impairment of a transmitter end according to a preset period or a preset condition, and transmit the parameter of the impairment of the transmitter end to a second compensator to compensate for the impairment of the transmitter end in the received signal, and/or transmit the parameter of the impairment of the transmitter end to the management device, so that the management device analyzes a cause of the impairment and/or calibrates the transmitter according to the parameter of the impairment of the transmitter end.

Supplement 2. The apparatus according to supplement 1, wherein, the first monitoring unit includes:

a first determining unit configured to determine a first filter coefficient of the first monitoring unit according to a pilot signal inserted into a transmission signal; and a second determining unit configured to take the first filter coefficient and/or a parameter obtained through calculation according to the first filter coefficient as the parameter of the impairment of the receiver end;

and the second monitoring unit includes:

a third determining unit configured to determine a second filter coefficient of the second monitoring unit according to a pilot signal inserted into a transmission signal; and a fourth determining unit configured to take the second filter coefficient and/or a parameter obtained through calculation according to the second filter coefficient as the parameter of the impairment of the transmitter end.

Supplement 3. The apparatus according to supplement 2, wherein, coefficients on a leading diagonal in the first filter coefficient of the first monitoring unit denote differences of amplitude-frequency responses and phase-frequency responses between signals of paths of the receiver end, and coefficients on an off-diagonal denote distribution and magnitudes of frequencies of crosstalk between the signals of paths of the receiver end.

Supplement 4. The apparatus according to supplement 2, wherein the pilot signal is a constant modulus signal.

Supplement 5. The apparatus according to supplement 1, wherein, the first monitoring unit is a multiple input multiple output monitor based on a blind equalization algorithm;

and the second monitoring unit is a multiple input multiple output monitor based on a minimum mean square error algorithm or a least-mean-square algorithm.

Supplement 6. An impairment monitoring and compensating system, including:
the impairment monitoring apparatus as described in any one of supplements 1-5; and
a first compensator configured to compensate for an impairment of a receiver end in a received signal, and/or a second compensator configured to compensate for an impairment of a transmitter end in a received signal; and/or
a management device configured to analyze a cause of an impairment and/or calibrate the receiver and/or the transmitter according to a parameter of an impairment of the receiver end and/or a parameter of an impairment of the transmitter end.

Supplement 7. The system according to supplement 6, wherein,
the first compensator and the second compensator are quasi-static compensators.

Supplement 8. The system according to supplement 6, wherein,
the first compensator and/or the second compensator compensate for the impairment of the receiver end and/or the impairment of the transmitter end according to a parameter of an impairment of the receiver end and/or a parameter of an impairment of the transmitter end determined by the impairment monitoring apparatus.

Supplement 9. A receiver, including the impairment monitoring apparatus as described in any one of supplements 1-5 or the impairment monitoring and compensating system as described in any one of supplements 6-8.

Supplement 10. An impairment monitoring method, applicable to a receiver end, the method including:
determining a parameter of an impairment of the receiver end by a first monitoring unit according to a preset period or a preset condition, and transmitting the parameter of the impairment of the receiver end to a first compensator to compensate for the impairment of the receiver end in a received signal, and/or transmitting the parameter of the impairment of the receiver end to a management device, so that the management device analyzes a cause of the impairment and/or calibrates the receiver according to the parameter of the impairment of the receiver end; and/or
determining a parameter of an impairment of the transmitter end by a second monitoring unit according to a preset period or a preset condition, and transmitting the parameter of the impairment of the transmitter end to a second compensator to compensate for the impairment of the transmitter end in the received signal, and/or transmitting the parameter of the impairment of the transmitter end to the management device, so that the management device analyzes a cause of the impairment and/or calibrates the transmitter according to the parameter of the impairment of the transmitter end.

Supplement 11. The method according to supplement 10, wherein,
the determining a parameter of an impairment of the receiver end includes:
determining a first filter coefficient of the first monitoring unit according to a pilot signal inserted into a transmission signal; and
taking the first filter coefficient and/or a parameter obtained through calculation according to the first filter coefficient as the parameter of the impairment of the receiver end;
and the determining a parameter of an impairment of the transmitter end includes:
determining a second filter coefficient of the second monitoring unit according to a pilot signal inserted into a transmission signal; and
taking the second filter coefficient and/or a parameter obtained through calculation according to the second filter coefficient as the parameter of the impairment of the transmitter end.

Supplement 12. The method according to supplement 11, wherein,
the coefficients on a leading diagonal in the first filter coefficient may denote differences of amplitude-frequency responses and phase-frequency responses between signals of paths of the receiver end, and coefficients on an off-diagonal may denote distribution and magnitudes of frequencies of crosstalk between the signals of paths of the receiver end.

Supplement 13. The method according to supplement 11, wherein,
the pilot signal is a constant modulus signal.

Supplement 14. The method according to supplement 10, wherein,
the first monitoring unit is a multiple input multiple output monitor based on a blind equalization algorithm;
and the second monitoring unit is a multiple input multiple output monitor based on a minimum mean square error algorithm or a least-mean-square algorithm.

Supplement 15. An impairment monitoring and compensating method, including:
the impairment monitoring method as described in any one of supplements 10-14; and
compensating for an impairment of a receiver end in a received signal, and/or compensating for an impairment of a transmitter end in a received signal; and/or
analyzing a cause of an impairment and/or calibrating the receiver and/or the transmitter according to a parameter of an impairment of the receiver end and/or a parameter of an impairment of the transmitter end.

Supplement 16. The method according to supplement 15, wherein,
the first compensator and the second compensator are quasi-static compensators.

Supplement 17. The method according to supplement 15, wherein,
the compensating for an impairment of a receiver end in a received signal includes: compensating for the impairment of the receiver end according to a parameter of an impairment of the receiver end determined by the impairment monitoring apparatus;
and the compensating for an impairment of a transmitter end in a received signal includes: compensating for the impairment of the transmitter end according to a parameter of an impairment of the transmitter end determined by the impairment monitoring apparatus.

The invention claimed is:

1. An impairment monitoring apparatus, provided in a receiver end apparatus, the receiver end apparatus comprising:
a first monitor to,
determine a parameter of an impairment in communication performance of the receiver end apparatus according to a set period or a set condition, and
transmit the parameter of the impairment of the receiver end apparatus to a first compensator to compensate for the impairment of the receiver end apparatus in a received signal, and/or
transmit the parameter of the impairment of the receiver end apparatus to a management device to cause the management device to analyze a cause of the impairment and/or calibrate the receiver end apparatus according to the parameter of the impairment of the receiver end apparatus; and/or a second monitor to,
- determine a parameter of an impairment in communication performance of a transmitter end apparatus according to a set period or a set condition, and
- transmit the parameter of the impairment of the transmitter end apparatus to a second compensator to compensate for the impairment of the transmitter end apparatus in the received signal, and/or
- transmit the parameter of the impairment of the transmitter end apparatus to the management device to cause the management device analyze a cause of the impairment and/or calibrate the transmitter end apparatus according to the parameter of the impairment of the transmitter end apparatus, wherein,
when determining the parameter of the impairment of the receiver end apparatus, the first monitor is to,
- determine a first filter coefficient according to a pilot signal inserted into a transmission signal, and
- take the first filter coefficient and/or a parameter obtained through a calculation according to the first filter coefficient as the parameter of the impairment of the receiver end apparatus; and when determining the parameter of the impairment of the transmitter end apparatus, the second monitor is to,
- determine a second filter coefficient according to a pilot signal inserted into a transmission signal, and
- take the second filter coefficient and/or a parameter obtained through a calculation according to the second filter coefficient as the parameter of the impairment of the transmitter end apparatus.

2. The apparatus according to claim 1, wherein,
coefficients on a leading diagonal in the first filter coefficient denote differences of amplitude-frequency responses and phase-frequency responses between signals of paths of the receiver end apparatus, and coefficients on an off-diagonal denote distribution and magnitudes of frequencies of crosstalk between the signals of paths of the receiver end apparatus.

3. The apparatus according to claim 1, wherein the pilot signal is a constant modulus signal.

4. The apparatus according to claim 1, wherein,
the first monitor is an MIMO monitor based on a blind equalization algorithm; and
the second monitor is an MIMO monitor based on a minimum mean square error algorithm or a least-mean-square algorithm.

5. A system, comprising:
a first compensator to,
- determine a parameter of an impairment in communication performance of a receiver end apparatus according to a set period or a set condition, and
- compensate for the impairment of the receiver end apparatus in a received signal according to the parameter of the impairment of the receiver end apparatus, and/or
- analyze a cause of the impairment and/or calibrate the receiver end apparatus according to the parameter of the impairment of the receiver end apparatus; and/or a second compensator to,
- determine a parameter of an impairment in communication performance of a transmitter end apparatus according to a set period or a set condition, and
- compensate for the impairment of the transmitter end apparatus in the received signal according to the parameter of the impairment of the transmitter end apparatus, and/or
- analyze a cause of the impairment and/or calibrate the transmitter end apparatus according to the parameter of the impairment of the transmitter end apparatus, wherein, when determining the parameter of the impairment of the receiver end apparatus, the first compensator is to,
- determine a first filter coefficient according to a pilot signal inserted into a transmission signal, and
- take the first filter coefficient and/or a parameter obtained through a calculation according to the first filter coefficient as the parameter of the impairment of the receiver end apparatus; and when determining the parameter of the impairment of the transmitter end apparatus, the second compensator is to,
- determine a second filter coefficient according to a pilot signal inserted into a transmission signal, and
- take the second filter coefficient and/or a parameter obtained through a calculation according to the second filter coefficient as the parameter of the impairment of the transmitter end apparatus.

6. The system according to claim 5, wherein,
when the first compensator compensates for the impairment of the receiver end apparatus in the received signal according to the parameter of the impairment of the receiver end apparatus, the first compensator is a quasi-static compensator; and
when the second compensator compensates for the impairment of the transmitter end apparatus in the received signal according to the parameter of the impairment of the transmitter end apparatus, the second compensator is a quasi-static compensator.

7. The system according to claim 5, wherein,
the system includes an impairment monitoring apparatus, and
the first compensator determines the parameter of the impairment of the receiver end according to a parameter of the impairment of the receiver end apparatus determined by the impairment monitoring apparatus; and
the second compensator determines the parameter of the impairment of the transmitter end apparatus according to a parameter of the impairment of the transmitter end determined by the impairment monitoring apparatus.

8. A method, comprising:
determining a parameter of an impairment in communication performance of the receiver end apparatus by a first monitor according to a set period or a set condition, and
- transmitting the parameter of the impairment of the receiver end apparatus to a first compensator to compensate for the impairment of the receiver end apparatus in a received signal, and/or
- transmitting the parameter of the impairment of the receiver end apparatus to a management device to cause the management device analyze a cause of the impairment and/or calibrate the receiver end apparatus according to the parameter of the impairment of the receiver end apparatus; and/or determining a parameter of an impairment in communication performance of a transmitter end apparatus by a second monitor according to a set period or a set condition, and transmitting the parameter of the impairment of the transmitter end apparatus to a second compensator to compensate for the impairment of the transmitter end apparatus in the received signal, and/or transmitting the parameter of the impairment of the transmitter end apparatus to the management device to cause the management device analyze a cause of the impairment and/or calibrate the transmitter end apparatus according to the parameter of the impairment of the transmitter end apparatus, wherein, the determining the parameter of the impairment of the receiver end apparatus includes, determining a first filter coefficient of the first monitor according to a pilot signal inserted into a transmission signal, and taking the first filter coefficient and/or a parameter obtained through a calculation according to the first filter coefficient as the parameter of the impairment of the receiver end apparatus; and the determining the parameter of the impairment of the transmitter end apparatus includes, determining a second filter coefficient of the second monitor according to a pilot signal inserted into a transmission signal, and taking the second filter coefficient and/or a parameter obtained through a calculation according to the second filter coefficient as the parameter of the impairment of the transmitter end apparatus.

\* \* \* \* \*